United States Patent [19]

Lowrie

[11] 3,722,631

[45] Mar. 27, 1973

[54] VEHICULAR CHOCK

[76] Inventor: Walter B. Lowrie, 104 Newkirk Avenue, Glenshaw, Pa. 15116

[22] Filed: Aug. 20, 1971

[21] Appl. No.: 173,398

[52] U.S. Cl. .................................. 188/4 R, 188/32
[51] Int. Cl. .............................................. B60t 1/04
[58] Field of Search ............ 188/4 R, 4 B, 5, 6, 7, 32

[56] References Cited

UNITED STATES PATENTS

| 828,633 | 8/1906 | Stuart | 188/4 R |
| 1,388,940 | 8/1921 | Finch | 188/4 R |
| 3,321,046 | 5/1967 | Cooper | 188/4 R |
| 3,517,776 | 6/1970 | Corti et al. | 188/4 R |

*Primary Examiner*—Duane A. Reger
*Attorney*—Green, McCallister & Miller

[57] ABSTRACT

A tire-engaging wheel-blocking or chocking device for a motor vehicle has three parts comprising an overhead tubular assembly for mounting on the under side of the vehicle adjacent a wheel that is to be chocked, a collapsible-expandable suspended arm assembly that is swingably and rotatably carried by a stub shaft for movement within a stowing tube of the mounting assembly when the vehicle is to be operated, and a chock assembly which is bifurcated at its back end and swung from a lower end of the arm assembly. The arm assembly is made up of a pair of telescopically mounted and guided arm members. A finger lift means is pivotally carried by the bifurcated back end portion of a chock shoe of the chock assembly for engaging a road surface to tilt the shoe to release it from a cooperating chocking position with respect to an associated wheel assembly.

16 Claims, 12 Drawing Figures

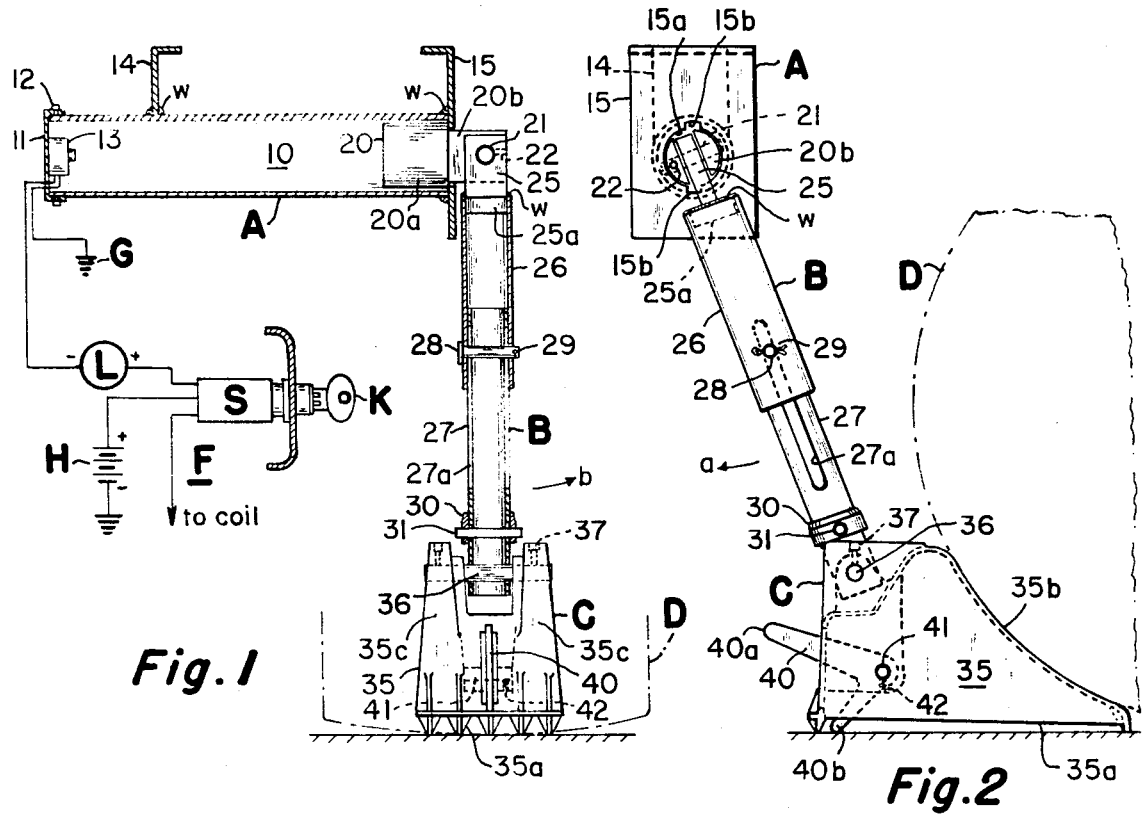
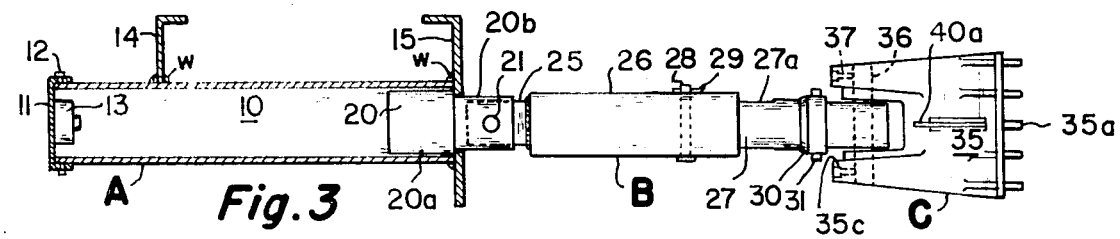
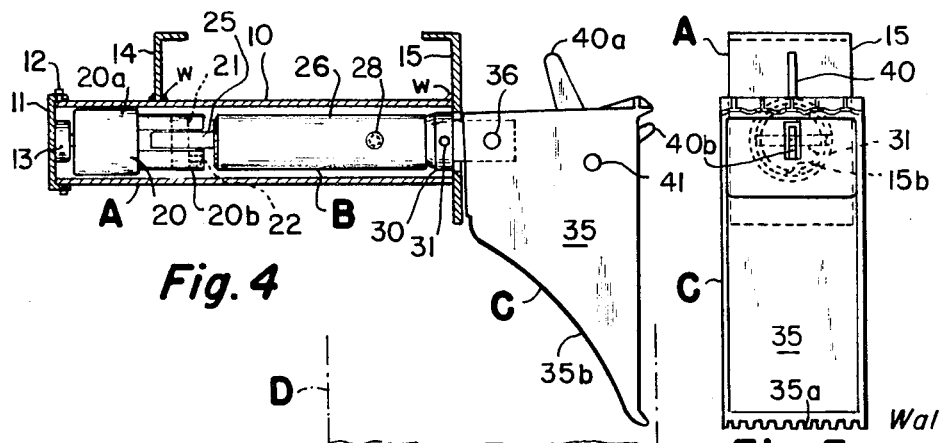

3,722,631

INVENTOR.
Walter B. Lowrie

BY
Green, McCallister & Miller
HIS ATTORNEYS

VEHICULAR CHOCK

BACKGROUND OF THE INVENTION

1. Field of the Invention

This invention pertains to an improved vehicular wheel chocking device that is particularly suited for heavy duty vehicles such as trucks, tractor trailers, etc., and particularly, to an efficient and relatively simple chocking device or construction that may be securely retained in an out-of-the-way protected and collapsed position when not in use and that may be readily released and moved to a chocking position when the need for its use arises.

2. Description of the Prior Art

Although various forms of chocking apparatus have been devised in the art, they have been more or less shunned by the operators in view of various difficulties or deficiencies in their utilization such as the complexity of their construction and operation, difficulty in releasing them when a vehicle is to be moved, waste of space in their construction and mounting, and a tendency for them to become released or to rattle when the vehicle is in operation.

SUMMARY OF THE INVENTION

It has thus been an object of the invention to devise and provide a chocking device for heavy vehicles that is relatively simple and inexpensive in its construction that will present a minimum of interference with the normal operation and maintenance of the vehicle;

Another object has been to devise a manually operated, easily latched and released, three-part telescopic type of chock device that may be used for one or both sides of the tire of a vehicle;

A further object has been to provide a chocking device that can be easily released from a tight chocking position with respect to an associated tire;

These and other objects will appear to those skilled in the art from the illustrated embodiment and the description thereof.

BRIEF DESCRIPTION OF THE DRAWINGS

In the drawings,

FIG. 1 is a front view in elevation and partial section of a chocking device constructed in accordance with the invention.

FIG. 2 is a side elevation on the scale of and of the device of FIG. 1 showing the device in a chocking position between a road or floor surface and the tire of a vehicle wheel.

FIG. 3 is a front elevation of the device of FIGS. 1 and 2 and on the scale of such figures; in this view a chock shoe of the device has been swung to a substantially fully vertical position in the direction of the arrow $a$ of FIG. 2, its arm assembly has then been swung to an upper, horizontal, axially aligned position with respect to its tubular mounting assembly in the direction indicated by the arrow $b$ of FIG. 1, and members of the arm assembly are in a partially collapsed position with respect to each other; its tubular mounting assembly is shown in section.

FIG. 4 is a view similar to FIG. 3, but illustrates members of the arm assembly as being fully collapsed with respect to each other, and as being fully inserted within a stowing tube of the tubular mounting assembly; the arm assembly has been turned to a position in which its latch pin has locked it within the mounting assembly, and the positioning of the chock shoe is such that the force of gravity thereon or its weight will tend to maintain the device in an upper out-of-the-way, collapsed, latched and inner position.

FIG. 5 is a front end view on the scale of and of the device in the position of FIG. 4.

DESCRIPTION OF THE PREFERRED EMBODIMENT

Figure 6:
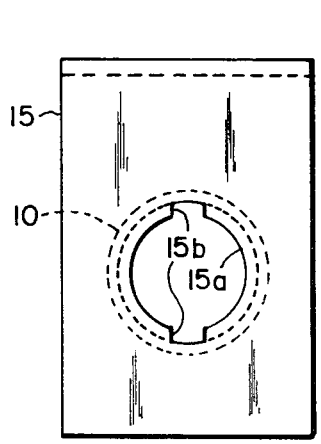
FIG. 6 is an enlarged side end view in elevation showing a front hanger or mounting bracket of the device that is adapted to be secured to the under side of the frame or bed of a vehicle.
Figure 7:
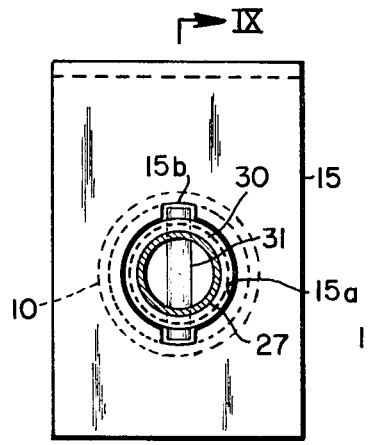
FIG. 7 is a view on the scale of and similar to FIG. 6, but illustrates the latching pin of the arm assembly of FIGS. 1 and 2 as being in an aligned, insertable position with respect to opposed recesses in the front mounting bracket; this is preliminary to fully latching the device in the position illustrated in FIGS. 4 and 5.

Referring particularly to FIGS. 1 and 2 of the drawings, a representative chocking device or apparatus constructed in accordance with the invention is provided with an overhead tubular mounting or support tube assembly A, a cooperating, collapsible-expandable, telescopic connecting arm assembly B and a chock or wedge assembly C. The mounting assembly A has a transversely extending, open-end, stowing or mounting tube or member 10 which, at its back end, is closed by a cap or cuplike end cover member 11. As shown in FIG. 1, the end cover 11 may be secured in position by set screws 12 and carries a normally closed, electric micro switch 13 that is mounted on its inner surface in alignment with an operating chamber within the tubular member 10, and that is employed to indicate when the device is out of a latched-in position with respect to the tubular mounting assembly A. A pair of longitudinally spaced-apart and upwardly extending mounting brackets or mounting plate members of angle-shape 14 and 15 are shown secured, as by weld metal $w$, to project upwardly from the tubular member 10 for securing it adjacent to and on the under side of the bed or frame of a vehicle such as E. Front righthand or outer bracket member 15, as shown, extends along the open outer end or mouth of the tubular member 10 and has a circular bore or opening 15a therein that is of slightly smaller diameter than the inside diameter of the tube 10 to thus provide a front rim, limit flange or shoulder about the forward end portion of the chamber of the tubular member 10.

A stub shaft 20 is operatively positioned for back and forth and rotative movement within the chamber of the stowing tube or tubular member 10 through the agency of its inner, enlarged, solid cylindrical portion 20a. It will be noted that the limit flange or rim of the bracket member 15 thus serves as a positive stop for preventing the forward outward removal of the portion 20a of the stub shaft 20. The stub shaft 20 has a pair of bifurcated or split-apart, opposed ear or spherical segmental parts or portions 20b that define a circle that is of smaller diameter than the diameter of the chamber within the tubular member 10 and that corresponds to, but is slightly less than the diameter defined by the rim or flanged opening 15a in the bracket or mounting member 15.

As shown particularly in FIG. 2, a connector tongue 25 of rectangular shape is adapted to fit between the opposed inner planar faces of the bifurcated portions 20b for swinging movement with respect thereto. The lower end of the tongue 25 has a rounded or circular plug portion 25a that fits within and is secured by weld metal w to the upper open end portion of the tubular arm member 26. A cross-extending pivot pin 21 swingably or pivotally secures the lug 25 in position and is, in turn, removably secured in position with respect to at least one of the outwardly curved segments 20b by a set screw 22.

The arm assembly B has an upper hollow or tubular arm member 26 to the upper closed end of which the connector tongue 25 is secured, as by weld metal w. The lower end portion of the arm member 26 carries a cross-extending, boltlike connecting and guide pin 28 that guidably receives and is adapted to slide along a pair of elongated, closed-end slots 27a within and along opposed sides of a lower arm member 27. The arm member 27 is of smaller diameter than the upper member 26 and is adapted to telescope or slide within the upper member through its lower open-end, as guided in a connected and controlled manner by the connecting and guide pin 28. A cotter pin 29 is shown as mounting the pin 28 in position.

Figure 8:
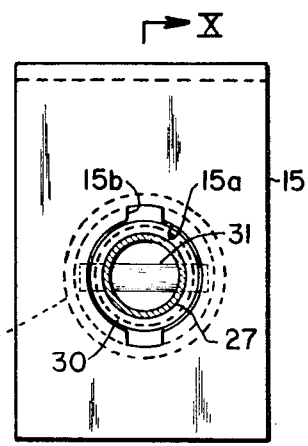
FIG. 8 is a view on the scale and similar to FIGS. 6 and 7, but showing the arm assembly of the device as rotated about 90°, such that its latch pin is locked within the stowing tube of the mounting assembly; this represents the final stowed and latched position of FIGS. 4 and 5.
Figure 9:
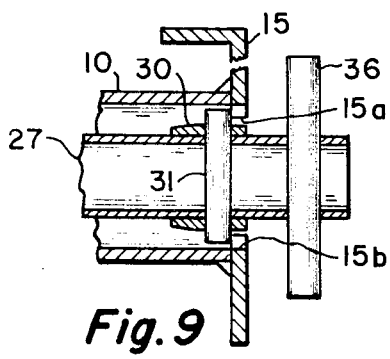
FIG. 9 is an end section in elevation on the scale of and along the line IX—IX of FIG. 7
Figure 10:
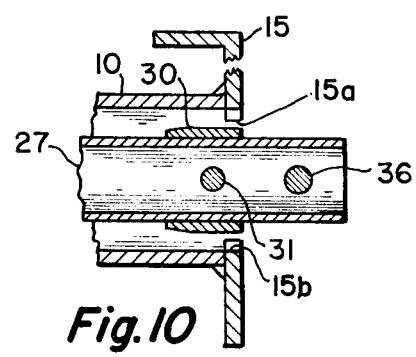
FIG. 10 is an end section in elevation on the scale of and along the line X—X of FIG. 8.

A somewhat conically-shaped collar 30 is secured, as by sweating or welding, on the lower arm member 27 adjacent its lower end to serve as a limit stop for the collapsed or inward telescopic positioning of the lower arm member 27 within the upper arm member 26 (see FIG. 4). The collar 30 also serves as a mount for a cross-extending latch pin 31. When the arm assembly B is moved to a collapsed position from the standpoint of its own members 26 and 27 and is to be moved into a telescopic collapsed position with respect to or within the stowing tube or member 10, the full inward telescopic and latching positioning of FIGS. 4, 5 and 8 may be attained by first aligning the latch pin 31 with a pair of opposed, upper and lower or vertically positioned slot or recessed portions 15b within the front plate portion of the bracket or mounting member 15. The next step is to turn the arm assembly B and its associated chock assembly C about 90° to the position shown in FIGS. 4, 5, and 8 to thereby lock the latch pin 31 behind the flanged or rimmed open portion 15a of the bracket member 15.

Wheel-cooperating or tire-wedging block or chocking assembly C is illustrated as having a group of spaced-apart, downwardly projecting and longitudinally extending corrugations or reinforcing ribs 35 along a bottom face of its chock shoe 35. The front face 35b of the chock shoe 35 is of curvilinear or concave wedge-shape that converges downwardly towards the wheel and corresponds substantially in curvature to the curvature of an associated tire and wheel assembly D (see FIG. 2). The upper and back portions of the chock shoe 35 are of bifurcated or two-part construction, with bifurcations or opposed parts 35c serving to mount a cross-extending swing or pivot shaft 36 that serves to swingably suspend the shoe 35 from the lower end portion of the lower arm member 27. The shaft 36 may be removably secured in position, as shown in FIGS. 1 and 2, by set screws 38.

As shown particularly in FIGS. 1, 2 and 4, the bifurcated portions 35C of the chock shoe 35 also pivotally carry or have mounted therebetween a lift finger release member 40. Pivot shaft or pin 41 extends through the bifurcated portions 35c and through a central or mid portion of the lift release finger 40 and is removably secured thereon by set screw 42. The member 40 has a backwardly upwardly inclined foot pedal or extending lever arm portion 40a and a downwardly backwardly extending lifting-foot or finger portion 40b. The member 40 thus has somewhat of a dog leg or angle shape, such that when the portion 40a is in its upper position, the foot or leg finger portion 40b merely rests on the road or floor surface, as illustrated in FIG. 2. The end of the finger or foot portion 40b thus lies between the ribs or corrugations 35a of the shoe 35 when the vehicle wheel assembly D is to be positively retained in a particular position.

When the operator of the vehicle wishes to move it from its stationary position, great difficulty would be encountered in endeavoring to get the shoe 35 initially free of the assembly D without the lift finger member 40. Such release member makes it possible to press downwardly on the end of the foot portion 40a to cause the finger or lift portion 40b to move towards a vertical position and thus, in effect, "break" the secure position of the shoe 35 with respect to the wheel assembly D. This operation which may be accomplished by the foot of the workman, results in a tilting of the back end of the shoe 35 in such a manner that it can then thereafter easily be withdrawn, along with the arm assembly cam B.

Figure 11:
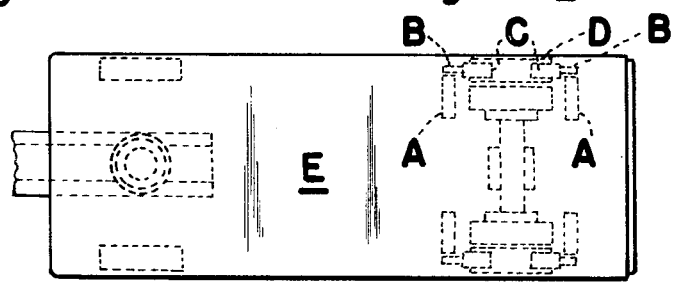
FIG. 11 is a greatly reduced top plan view of a representative trailer which has pairs of devices of the invention mounted adjacent each of its side-positioned back wheels to provide for chocking them against both directions of movement.
Figure 12:
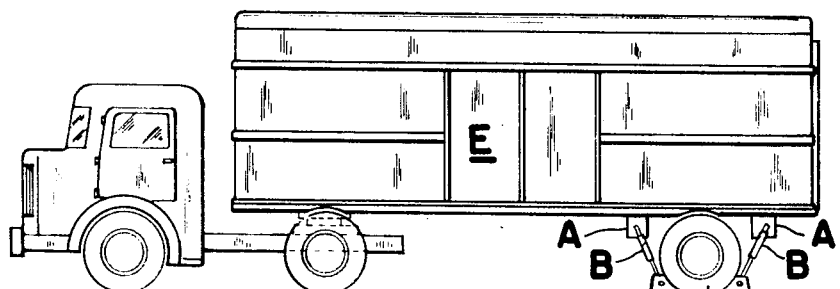
FIG. 12 is a side view in elevation on the scale of FIG. 11, showing the trailer of such figure as mounted on a tractor; it further illustrates a side-positioned pair of chock devices in their down-extended and movement-preventing, road-surface and tire-engaging positioning.

It will be apparent to those skilled in the art that a device of the invention may, as shown in FIGS. 11 and 12, be employed in the form of wheel pairs for each back wheel D of a vehicle E, may be employed as single units for each wheel D in the direction of slope of the floor or road surface, or may be employed as a single unit for one wheel assembly D in the direction of the slope of the road surface or as a pair of devices for the same wheel D to assure against movement in either direction along the road or floor surface.

A warning system is shown in FIG. 1 which may desirably be employed for indicating to the operator of the vehicle that a particular chocking device is either in a desired fully collapsed and latched position, such as shown in FIGS. 4 and 5, has not been lifted out of position with respect to a wheel assembly D, or has not been fully latched in the stowing tube 10. The system illustrated includes the normally closed micro switch 13 that is opened by end-engagement of the stub shaft 20 therewith when the arm assembly B is in the fully latched position of FIG. 4. The switch 13 is electrically connected on one side to the ground side G of a conventional source of energy, such as storage battery H, and on its other side to ignition switch S. The switch 13 when closed provides electric current flow from the battery H to energize or light an electric indicator bulb or lamp L in the cab of the truck or tractor where the operator has inserted an ignition key K into and has turned the ignition switch S to an "on" position. If the lamp L lights, the operator knows that he must make an investigation to determine whether he has forgotten to lift the shoe 35 out of its full chocking position of FIG. 2, or whether he has neglected to fully move the arm assembly B into a collapsed and latching engagement within the stowing tube 10.

I claim:

1. In an improved chocking device for vehicular wheel engagement, an overhead tubular mounting assembly adapted to be secured to an under side of the vehicle adjacent a wheel thereof, a collapsible-expandable arm assembly at its upper end pivotally secured on said mounting assembly for alternate movement into a substantially fully collapsed inwardly slid position with respect thereto and a lower substantially fully extending position adjacent the wheel that is to be chocked, a chock shoe assembly pivotally mounted on a lower end of said arm assembly and adapted to be moved into and out of a wedging relation between the wheel and a road surface, and said mounting assembly having a hollow open-end tubular member adapted to telescopically receive said arm assembly therein when said arm assembly is in its fully collapsed position.

2. In a chocking device as defined in claim 1, said arm assembly having a stub shaft slidably positioned within said tubular member, and means cooperating with said tubular member for retaining said stub shaft therein.

3. In a chocking device as defined in claim 2, said stub shaft being adapted to move back and forth and rotate within said tubular member, and means swingably securing an upper end of said arm assembly to said stub shaft.

4. In a chocking device as defined in claim 3, means cooperating with said tubular member and said arm assembly for latching said arm assembly in a fully collapsed and telescopically received position within said tubular member.

5. In a chocking device as defined in claim 3, an electric micro switch mounted adjacent a back end of said tubular member and adapted to be opened and closed by the back and forth movement of said stub shaft within said tubular member.

6. In a chocking device as defined in claim 5, an electric warning system connected to said switch to indicate when said arm assembly is not fully positioned within said tubular member.

7. In a chocking device as defined in claim 5 as employed in combination with a vehicular electrical system that includes a source of electrical energy and an electric ignition switch, an electrically energized warning means connected through the ignition switch and through said micro switch to the source of electrical energy, and said micro switch being normally closed and adapted to be opened by backwardly terminated movement of said stub shaft within said tubular member.

8. In a chocking device as defined in claim 1, said arm assembly comprising a pair of upper and lower tubular arm members that are telescopically-slidably-mounted and connected with respect to each other.

9. In a chocking device as defined in claim 1, said arm member assembly having a pair of upper and lower arm members, means slidably adjusting said pair of members with respect to each other for moving them between contracted positions and extended positions with respect to each other, a stub shaft slidably positioned within said overhead tubular mounting assembly for slidable movement therealong, a swingable connection between the upper end of said upper arm member and said stub shaft, and said upper arm member being adapted for supported movement on said stub shaft into and out of said mounting assembly.

10. In a chocking device as defined in claim 9, said lower arm member having a pin and slot connection with said upper arm member and being adapted to slide into and out of said upper arm member.

11. In a chocking device as defined in claim 9, said lower arm member having elongated guide slot means therealong, said upper arm member having a cross-extending pin guidably extending across said lower arm member through said guide slot means, and said lower arm member being adapted to slide into and out of said upper arm member along said cross-extending pin.

12. In a chocking device as defined in claim 9, said stub shaft having a pair of outwardly projecting bifurcated portions of rounded segmental shape and also being adapted to rotate within said tubular mounting assembly, said upper arm member having a pivot lug swingably mounted between said bifurcated portions, said arm assembly having an outwardly projecting latching pin, said mounting assembly having a tubular member provided with an operating chamber therealong that has an open front end portion, an inwardly projecting flange about said front open end portion for retaining said stub shaft within the operating chamber, and said flange having bypass notches for bypassing said latching pin into the chamber and for latching said pin within said chamber upon rotation of said arm assembly with respect to said mounting assembly.

13. In an improved chocking device for engaging the tire of a wheel of a vehicle for retaining the vehicle in a desired position on a road surface, an overhead support assembly adapted to be secured to an under side of the vehicle adjacent the wheel that is to be chocked, a collapsible and expandable connecting arm assembly swingably secured at its upper end on said mounting assembly, a chock assembly having a chock shoe pivotally mounted on the lower end of said arm assembly for movement into and out of engagement between the tire of the wheel and the road surface, said chock assembly having finger lift means operatively carried by said chock shoe and adapted to engage the road surface for initially pivoting said chock shoe out of wedging engagement with the tire when the vehicle is to be moved, and said arm and mounting assemblies having means for locking said arm assembly in an upper out-of-the-way retained position.

14. In a chocking device as defined in claim 13, said overhead support assembly having a stowing tube that defines an elongated chamber portion therein, said chamber portion being adapted to substantially fully receive said arm assembly therein when the device is in its upper out-of-the-way position, and means associated with said arm assembly and said stowing tube for locking said assembly in a collapsed position within said tube.

15. In a chocking device as defined in claim 14, said chock shoe having a bifurcated back end portion within which said finger lift means is pivotally mounted, and means cooperating with said bifurcated portion for swingably mounting said chock shoe on a lower end of said arm assembly.

16. In a chocking device as defined in claim 14, a cap closing-off a back end of the chamber portion of said stowing tube, normally closed switch means operatively mounted on the inside of said cap, an electric light circuit connected through an ignition switch to a battery of the vehicle, a stub shaft mounted for back and forth and rotative movement within said stowing tube, pivot means connecting a forward end of said shaft to an upper end of said arm assembly, and said shaft being adapted, when in a backward position within the chamber portion of said stowing tube, to engage said switch means to open it.

* * * * *